United States Patent [19]

Musschoot

[11] 4,299,692
[45] Nov. 10, 1981

[54] APPARATUS FOR HANDLING A MOLD BOX IN A VACUUM CASTING SYSTEM

[75] Inventor: Albert Musschoot, Barrington, Ill.

[73] Assignee: General Kinematics Corporation, Barrington, Ill.

[21] Appl. No.: 175,013

[22] Filed: Aug. 4, 1980

[51] Int. Cl.³ .............................................. B07B 1/28
[52] U.S. Cl. ........................................ 209/1; 209/240; 209/260; 209/364; 51/163.1; 366/114
[58] Field of Search ............... 51/163.1; 414/360, 361, 414/421; 366/111, 114; 198/345; 209/260, 240, 488, 489, 421, 415, 365, 366–367, 325, 326, 327, 342, 1, 2, 363 P, 364 P

[56] References Cited

U.S. PATENT DOCUMENTS

| | | | |
|---|---|---|---|
| 783,384 | 2/1905 | Patterson | 209/240 X |
| 1,159,707 | 11/1915 | Peterson | 366/114 X |
| 3,107,797 | 10/1963 | McFeaters | 414/421 X |
| 3,162,910 | 12/1964 | Behnke | 366/114 X |
| 3,408,774 | 11/1968 | Engel | 51/163.1 X |
| 3,991,524 | 11/1976 | Ferrara | 51/163.1 |
| 4,015,705 | 4/1977 | Dumbaugh | 198/770 |
| 4,152,255 | 5/1979 | Musschoot | 209/364 X |

FOREIGN PATENT DOCUMENTS

| | | | |
|---|---|---|---|
| 914406 | 1/1963 | United Kingdom | 51/163.1 |
| 1433426 | 4/1976 | United Kingdom | 51/163.1 |

Primary Examiner—Robert Halper
Attorney, Agent, or Firm—Wegner, Stellman, McCord, Wood & Dalton

[57] ABSTRACT

A vibratory apparatus for use in association with a vacuum casting apparatus wherein the box containing the sand and casting upon completion of the vacuum casting is moved on track means to a vibrating station where it is lifted off the track, tilted, and vibrated to discharge the sand and separate the sand from the casting.

2 Claims, 4 Drawing Figures

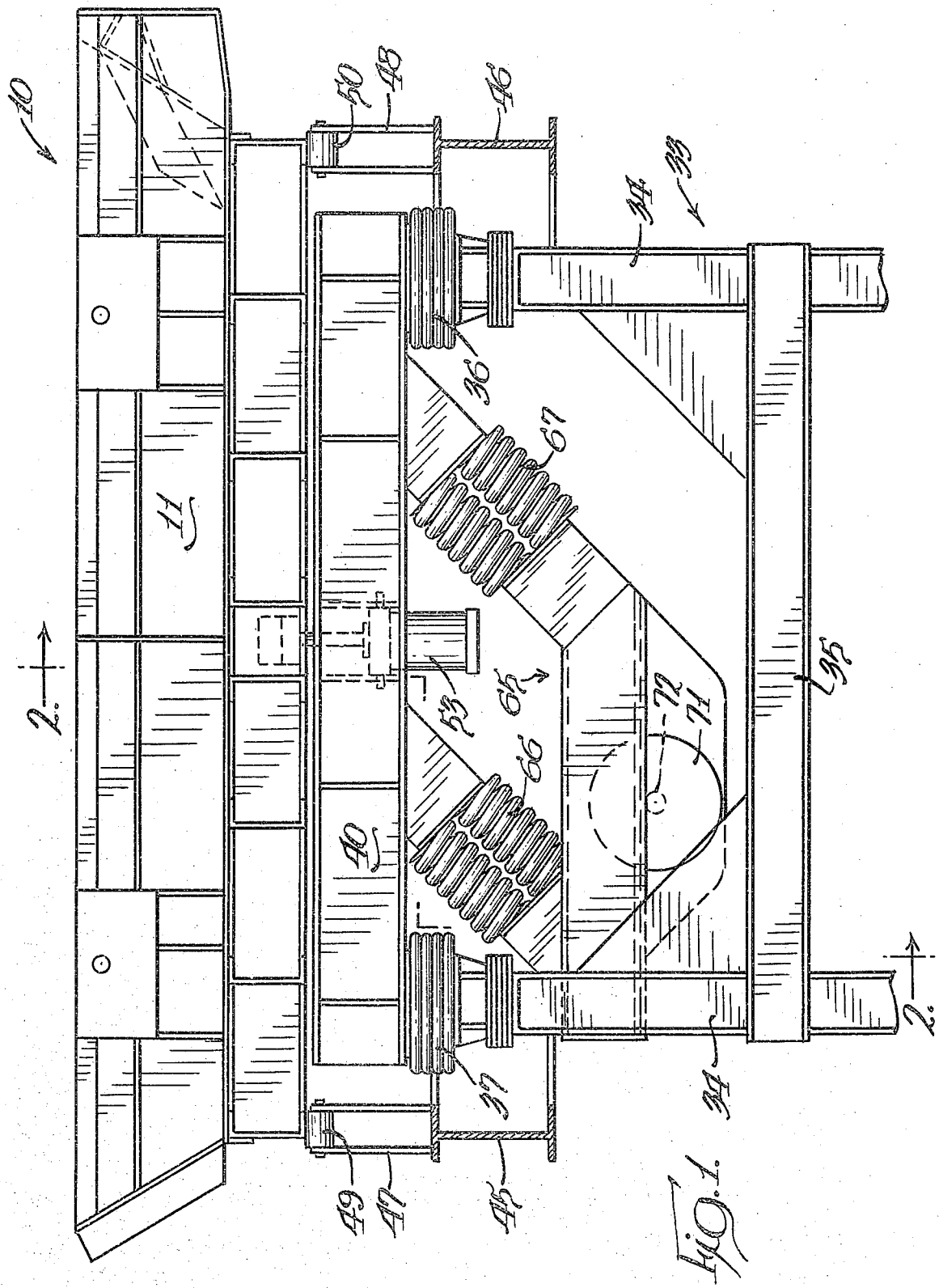

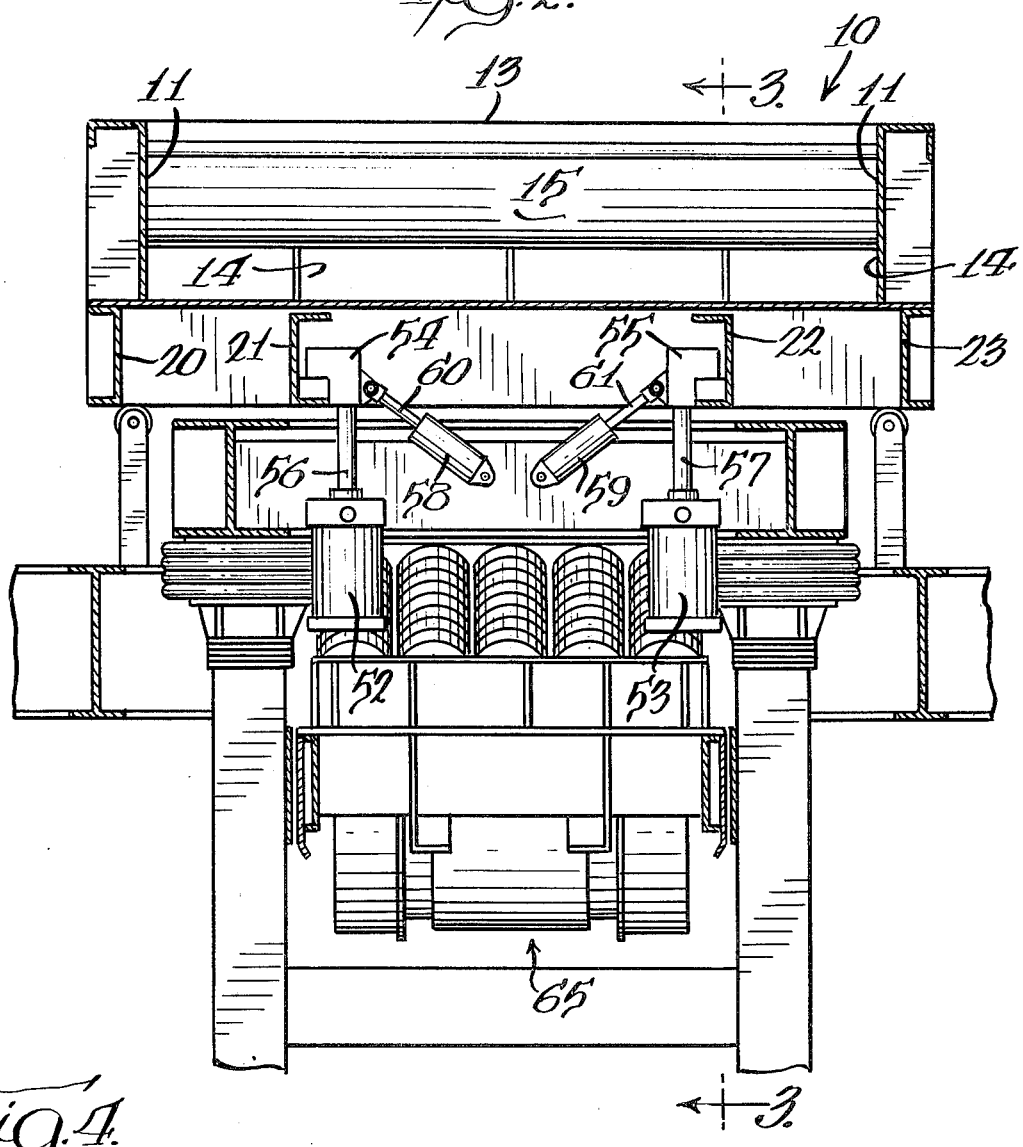
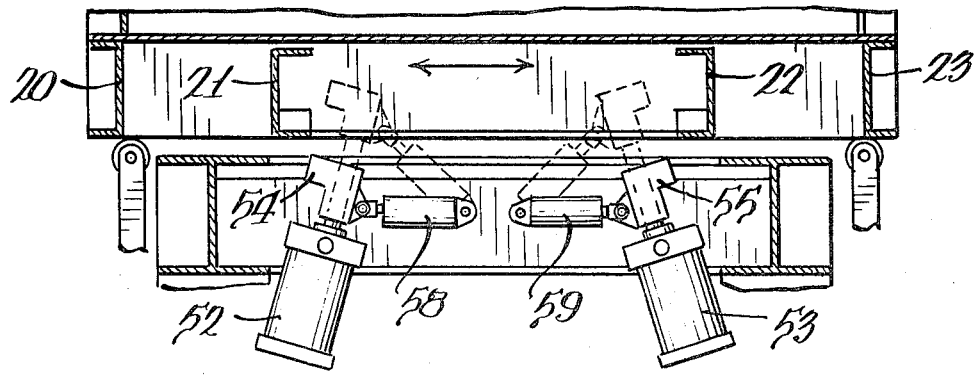

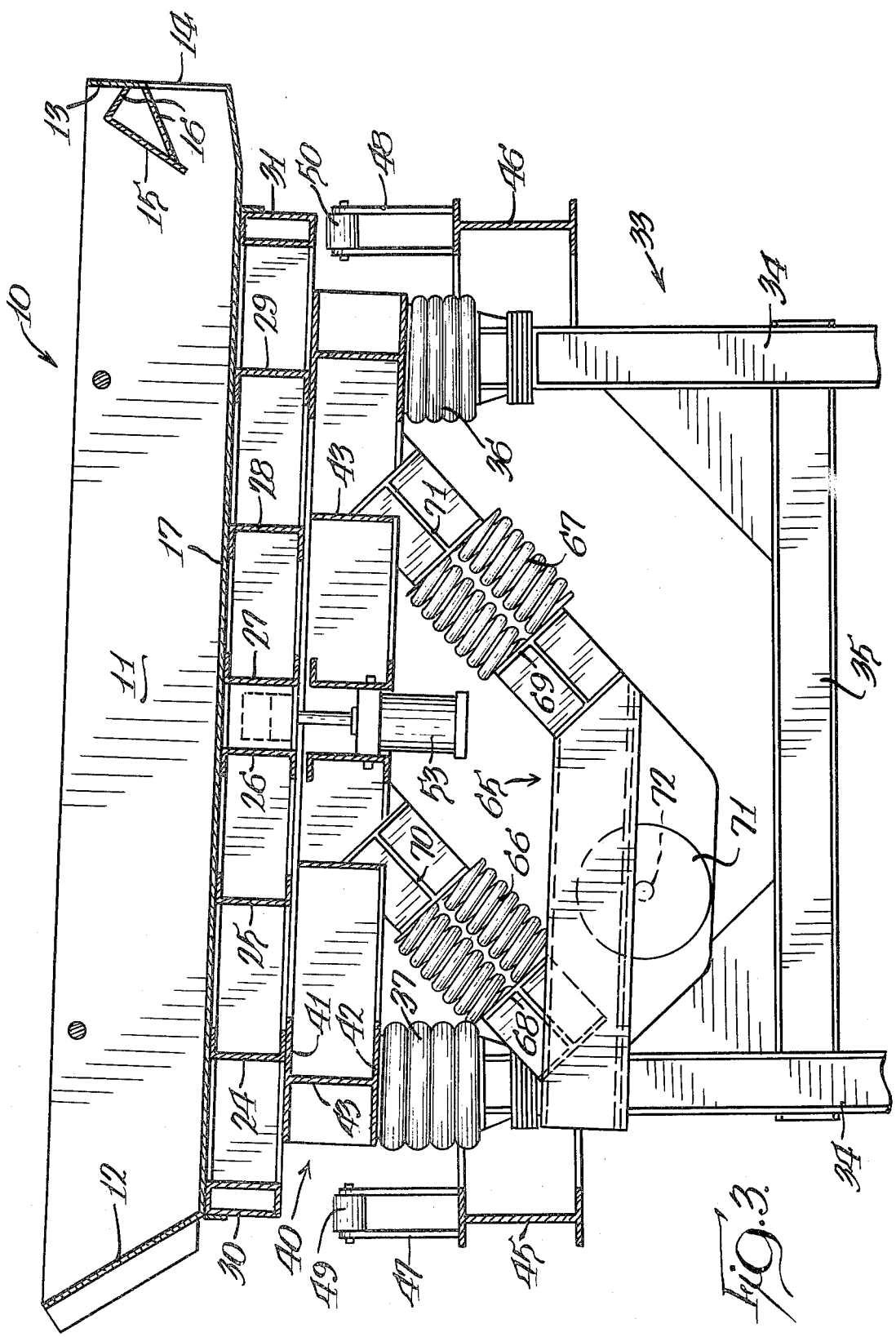

APPARATUS FOR HANDLING A MOLD BOX IN A VACUUM CASTING SYSTEM

BACKGROUND OF THE INVENTION

The art of metal casting is constantly improving. Substantial progress is being made in increasing productivity, in casting operations, reducing manpower requirements, and improving the quality of the casting. A method presently in use and apparently increasing in application is a vacuum casting method wherein a pattern is used to form a sand mold usually in conjunction with a plastic film between the sand and the pattern. A vacuum applied serves to retain the sand in position conforming to the outlines of the pattern even after the pattern is removed so that a very accurate casting results when molten metal is poured into the mold. In the vacuum casting process, after the metal has cooled sufficiently so as to be able to retain its shape, the mold parts are separated, leaving sand and the casting in a box. Means are then provided for removing the casting from the box after it has been cleaned of all foundry sand. This latter step has been accomplished by various means, none of which have proved to be completely satisfactory, and completion of this separation and removal step often causes delay in the process.

SUMMARY OF THE PRESENT INVENTION

According to the present invention, the box carrying the cooled casting and surrounding foundry sand is moved along a track-forming means to a vibrating apparatus. At the location of the vibrating apparatus, a platform is provided, which platform carries means for clamping the mold box to the platform. The platform is then elevated to lift the box off the track-forming means and also to tilt the box to position an opening at one end of the box lower than at the opposite end of the box. While the box is so held in elevated tilted position, vibration generating means are put into motion to vibrate the box somewhat in the manner of a vibratory feeder or conveyor. The vibrations serve to effectively separate the foundry sand from the casting and also to convey the foundry sand toward the opening in one end of the box for discharge into a receiving means so that the sand may be reused.

BRIEF DESCRIPTION OF THE DRAWINGS

FIG. 1 is a side elevational view of apparatus embodying the invention;

FIG. 2 is a vertical section along line 2—2 of FIG. 1;

FIG. 3 is a vertical section along line 3—3 of FIG. 2; and

FIG. 4 is a partial vertical section of the upper portion of the apparatus showing the clamping means in clamping and unclamping position.

DESCRIPTION OF THE PREFERRED EMBODIMENT

Referring to the drawings, there is shown a box 10 forming a part of a vacuum casting apparatus. When the casting has been completed and the molten metal is solidified the box 10 is separated from the balance of the vacuum casting apparatus in order to permit removal of the sand and casting therefrom. The box 10 is provided with parallel sides 11, a slanted end 12, and a vertical end 13 opposite the end 12. The end 13 is provided with a plurality of openings 14 positioned beneath a baffle 15 supported by plate 16 secured to the end wall 13.

The box 10 is provided with a solid bottom 17 to which is secured a plurality of longitudinally extending channel members 22 and 23. Transverse channel members 24-29 are also secured to the bottom of the box to provide a rigid thoroughly braced structure. Outer rectangular members 30 and 31 are also secured to the bottom of the box 10, which rectangular members form a part of the means for transporting the box from a casting station to a separating station for separating the sand and casting.

As indicated earlier, the apparatus includes means for vibrating the box 10 to separate the sand from the casting and to effect discharge of the former. Such apparatus includes a base 33 having a plurality of vertical posts 34 and horizontal braces 35. At the top of the posts 34 there is provided an extensible means in the form of two pairs 36 and 37 of pneumatic springs secured at their lower ends to the posts and at their upper ends to a platform 40. The platform 40 is provided with a top plate 41, a bottom plate 42, and reinforcing members 43 secured to and positioned between the top and bottom plates.

Means supported by the base are provided to form track means along which box 10 may be moved. In the embodiment shown, the track means include a pair of horizontal I-beams 45 and 46 carried by the posts 34 which I-beams extend from the vacuum casting station to the vibrating station defined by the apparatus shown in the drawings. A plurality of vertical standards 47 and 48 are supported by the I-beams 45 and 46, respectively, with the standards carrying rollers 49 and 50 positioned to engage the bottom of the rectangular members 30 and 31.

After the casting has been completed and the box 10 separated from the balance of the casting apparatus but still retaining the casting and sand, the box is rolled along the track-forming means just described to a position over the platform 40. The platform carries a pair of hydraulic piston and cylinder devices 52 and 53 pivotally secured thereto. The piston and cylinder devices are provided with hook-like securing means 54 and 55 carried by the ends of the piston rods 56, 57 of the piston and cylinder devices. Another pair of piston and cylinder devices 58 and 59 are pivotally mounted on the platform 40 with each of the piston and cylinder devices 58 and 59 being provided with piston rods 60 and 61 pivotally secured to the hook-like securing means 54 and 55.

When the box 10 is positioned over the platform 40 the piston and cylinder devices 52 and 53 are activated to extend the piston rods 56, 57 from the position shown in solid lines in FIG. 4 to the position shown in dotted lines therein, whereupon piston and cylinder devices 58 and 59 are actuated extending rods 60 and 61 to pivot the piston and cylinder devices 52 and 53 to the position shown in FIG. 2. Reverse operation of the piston and cylinder devices 52, 53 moves the hook-like portions 54 and 55 into engagement with the channel members 21 and 22 thereby clamping the box to the platform.

Means are provided to impart vibratory movement to the box when it is clamped to the platform. The vibrating means includes an exciter member 65 suspended from the underside of the platform 40 by a first plurality of parallel aligned springs 66 and a second plurality of aligned springs 67. The lower ends of springs 66 are secured to a spring support 68 secured to the exciter and the lower ends of springs 67 are secured to a second spring support 69 also secured to the exciter. Spring supports 70 and 71 secured to the underside of the platform 40 are attached to the upper end of spring pluralities 66 and 67, respectively. As shown in the drawings, the springs 66 and 67 extend at an acute angle to the horizontal. An electric motor 71 forms a part of the exciter 65 with the electric motor driving a shaft 72 carrying eccentric weights (not shown) to produce vibratory movement when the shaft is rotating.

When the casting has been completed at the vacuum casting station and the casting itself cooled sufficiently so as to be able to retain its shape, the box 10 is separated from the casting apparatus and rolled along the track-forming means to a position over the platform 40, an area which could be termed a vibrating station. At that time, the piston and cylinder devices 52 and 53 will be in the position shown in solid lines in FIG. 4. At that point, the piston and cylinder devices 52 and 53 are actuated to extend the connecting rods and the piston and cylinder devices 58, 59 operated to move the securing means 54, 55 in a position to engage the channel members 21 and 22. Reverse movement of the piston rods 56 and 57 will then serve to clamp the box firmly to the platform 40.

At that point, air under pressure is introduced into the pneumatic springs 36 and 37 to extend the same thereby to lift the platform upwardly. Preferably, the pneumatic springs 37 are extended more than the springs 36 in order to tilt the box to the position shown in FIG. 3. Such movement of the platform of course lifts the box off the track-forming means to the position shown in FIG. 3. At this point, electric motor 71 is set into operation and the vibratory movement is imparted to the platform and box thereon through the springs 66 and 67. The motor 71 is rotated at a speed slightly below the natural frequency of the two-mass system consisting of the exciter 65 on the one hand and the platform and box on the other, with the springs 36 and 37 serving as isolation springs between the vibratory mass and the base. Sand in the box 10 is vibrated loose from the casting therein and inasmuch as the box is tilted and the springs 66 and 67 are at an acute angle to the horizontal, vibratory movement is imparted to the sand to move it toward and out of the openings 14 for collection in any suitable manner. The casting will remain within the box and may be subsequently removed after it has been completely separated from the sand.

I claim:

1. Apparatus for removing casting sand from a casting in a box in a vacuum casting system comprising two spaced parallel elevated track-forming means, a box having a portion adapted to ride on the track-forming means, a base, extensible means mounted on the base between and below the track-forming means, a platform carried by the extensible means in a position below and between said track-forming means, means on the platform for clamping the box thereto, means for extending the extensible means to move the platform upwardly between the track-forming means to lift the box off the tracks, said means for extending being arranged to move one side of the platform upwardly a greater distance than the other side to place the box in a tilted attitude, an exciter member, a plurality of springs secured at their upper end to the platform and extending downwardly therefrom at an acute angle to the horizontal, the lower end of the springs being secured to and supporting the exciter member, and means for vibrating the exciter member.

2. Apparatus for removing casting sand from a casting in a box in a vacuum casting system comprising two spaced parallel elevated track-forming means, a box having a discharge opening at one end thereof, said box having a portion adapted to ride on the track-forming means, a base, a plurality of expandable pneumatic springs mounted at their lower ends on the base, a platform positioned between and below said parallel track-forming means, means securing the upper ends of the pneumatic springs to the platform, a plurality of fluid operated piston and cylinder devices carried by the platform and arranged when actuated to clamp the box to the platform, means for introducing air under pressure into the pneumatic springs to expand the same and move the platform upwardly between the track-forming means to lift the box off the track-forming means, said air introducing means being arranged to move one side of the platform upwardly a greater distance than the other side to place the box in a tilted attitude slanting downwardly in the direction of the discharge opening, a plurality of springs secured to the platform and extending downwardly therefrom at an acute angle to the horizontal, the lower end of the springs being secured to and supporting the exciter member, and means for vibrating the exciter member.

* * * * *